(12) United States Patent
Ricordel

(10) Patent No.: US 6,795,913 B1
(45) Date of Patent: Sep. 21, 2004

(54) METHOD FOR RESTARTING AN APPARATUS IF THE INTEGRITY OF DATA IN A MEMORY IS LOST DURING MICRO-OUTAGE OF POWER SUPPLY

(75) Inventor: Eloi Ricordel, Le Mans (FR)

(73) Assignee: Koninklijke Philips Electronics N.V., Eindhoven (NL)

( * ) Notice: Subject to any disclaimer, the term of this patent is extended or adjusted under 35 U.S.C. 154(b) by 563 days.

(21) Appl. No.: 09/718,248

(22) Filed: Nov. 22, 2000

(30) Foreign Application Priority Data

Nov. 30, 1999 (FR) .............................................. 99 15045

(51) Int. Cl.$^7$ ..................... G06F 15/177; G06F 1/26; H04B 1/38
(52) U.S. Cl. ..................... 713/2; 713/1; 713/340; 455/572
(58) Field of Search ................. 713/1, 2, 300, 713/310, 340; 455/572, 343

(56) References Cited

U.S. PATENT DOCUMENTS

| | | | | |
|---|---|---|---|---|
| 4,509,201 A | * | 4/1985 | Sekigawa et al. | ............ 455/572 |
| 4,530,027 A | * | 7/1985 | Berger | ......................... 361/92 |
| 4,652,139 A | * | 3/1987 | Sulcer, Jr. | ....................... 368/9 |
| 4,940,975 A | * | 7/1990 | Ide et al. | .................... 340/7.52 |
| 5,551,077 A | * | 8/1996 | Oda | ............................. 455/343 |
| 5,691,629 A | * | 11/1997 | Belnap | ....................... 323/266 |
| 5,793,186 A | * | 8/1998 | Watabe et al. | .............. 320/112 |
| 5,881,128 A | * | 3/1999 | Lee | ............................. 379/1.01 |
| 5,930,192 A | * | 7/1999 | Ishikawa | ..................... 365/229 |
| 5,995,808 A | * | 11/1999 | Hasegawa | .................. 340/7.32 |
| 6,265,849 B1 | * | 7/2001 | Ricordel | ..................... 320/132 |

FOREIGN PATENT DOCUMENTS

| | | | |
|---|---|---|---|
| DE | 4111859 A1 | * 10/1992 | |
| EP | 0607919 A2 | 7/1994 | ............ H04M/1/72 |
| JP | 351120644 A | * 10/1976 | |

OTHER PUBLICATIONS

Ishizuka et al., "Prediction of Remaining Battery Discharge Time in Telecommunications System" IEEE 1990, pp 543–550.*

* cited by examiner

Primary Examiner—Lynne H. Browne
Assistant Examiner—Chun Cao
(74) Attorney, Agent, or Firm—Jack D. Slobod

(57) ABSTRACT

This apparatus comprises a battery (15) for supplying a voltage to the apparatus, a power cut detecting circuit (20) for detecting cuts of this supply voltage, a random-access memory (12) fed by this battery (15). A processor (10) loads this data memory. To avoid this memory being reloaded after a very brief electric power cut of the battery, its integrity is tested. If its contents have remained intact, there is no need for it to be reloaded.

10 Claims, 2 Drawing Sheets

METHOD FOR RESTARTING AN APPARATUS IF THE INTEGRITY OF DATA IN A MEMORY IS LOST DURING MICRO-OUTAGE OF POWER SUPPLY

The invention relates to an apparatus comprising:
An electric power supply device for supplying a voltage to the apparatus,
an electric power cut detecting circuit for detecting cuts of this supply voltage,
a memory fed by this electric power supply device,
a device for loading this memory,
a restarting device for initializing the apparatus.

The invention also relates to a method of starting and restarting apparatus subjected to supply voltage cuts.

The invention finds its application in portable telephones forming part of cellular radio telephone networks.

A problem posed with this type of apparatus is the unwanted switching-off due to electric power supply cuts of the apparatus. This occurs, for example, with a mechanical shock that causes the supply voltage to be cut off very briefly. After this very brief electric power cut, which must be detected, it is necessary to make sure that certain measures are taken after this detection. On this subject European patent document no. EP 0 607 919 may be consulted.

In this document the duration of the micro cut of supply voltage is measured by means of a counter which implies the presence of an auxiliary battery for supplying electric power during the power cuts and various measures are taken as a function of this duration.

The present invention proposes to make the resumption of the operation of the apparatus more certain after a very brief electric power cut, without the need for an auxiliary battery or too complex circuits.

For this purpose, such apparatus is characterized in that it further includes:
a control device for controlling the integrity of the memory to switch the restart device into service in the case where the integrity of said memory is lost.

If the apparatus were dead before the resumption of the electric power supply, it is no longer necessary to switch the restart device into service.

A start and restart method is characterized in that, when a very brief electric power cut has been detected, the integrity of said random-access memory is tested, while the restart process is simplified if the contents of the random-access memory have not been changed during the very brief electric power cut.

These and other aspects of the invention are apparent from and will be elucidated, by way of non-limitative example, with reference to the embodiment(s) described hereinafter.

Figure 1:
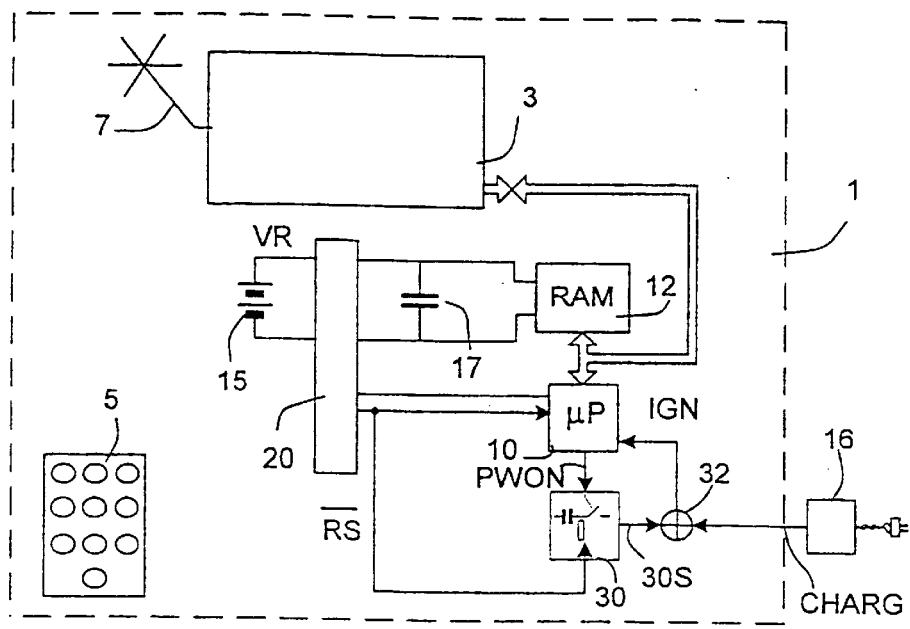
FIG. 1 represents an apparatus in accordance with the invention.

FIG. 1 represents an apparatus 1 in accordance with the invention. Within the described framework of the example, this apparatus is a cellular type of portable telephone. This apparatus notably comprises a transceiver circuit 3 to which are connected an antenna 7, a keyboard 5 and a processor 10 co-operating with a random-access memory 12 for managing its functioning. This apparatus is fed by a battery 15 which supplies a voltage VS. Furthermore, a battery charger 16 may be present for supplying electric power to the apparatus and recharging the battery. The presence of this charger is detected by a signal transmitted through a wire CHARG.

The random-access memory 12 contains starting and authentication data which permit the connection to the network. When there is a more or less short cut of the supply voltage supplied by the battery, the random access memory 12 runs the risk of no longer being supplied with electric power and its contents may be erased. If it is wise to recommence the start and authentication process after an electric power cut to reload the memory with useful data for the connection, this may imply entering data relating to the password by means of the keypad 5. It must be born in mind that this process is long and annoying to the user. It must also be considered that the random-access memory 12 is fed by the battery via a capacitor 17. If the very brief electric power cut has a short duration relative to the duration of the discharge of this capacitor 17, the contents of the memory may thus remain intact and it is no use recommencing the user's start and authentication process with the network.

To avoid unwanted starting up, the apparatus comprises a control device for controlling the integrity of the memory. This control device implies that the processor 10, which switches this integrity control into service, participates when a very brief electric power cut has been detected. This detection is effected by a power supply distribution circuit 20 which supplies a signal $\overline{RS}$ to a deriving circuit 30 which is sensitive to rising edges of this signal. This signal $\overline{RS}$ adopts the value "0" the moment the detected voltage is lower than a threshold VR, for example, half the nominal battery voltage. When the battery voltage VS becomes higher than VR, this signal $\overline{RS}$ adopts the value "1" after a duration equal to TS.

A logic signal PWON is produced by the processor 10. The value of this signal depends, inter alia, on the detection process of the integrity of the memory 12. This signal sets the output signal of the deriving circuit 30 to zero, when it has the value "1".

An adder circuit 32 adds the signals on the output 30S of the deriving circuit to the signals conveyed through the wire CHARG. The output signal of this circuit 32 is applied to the input IGN of the processor to set off the starting process when the output signal is active.

Figure 2:
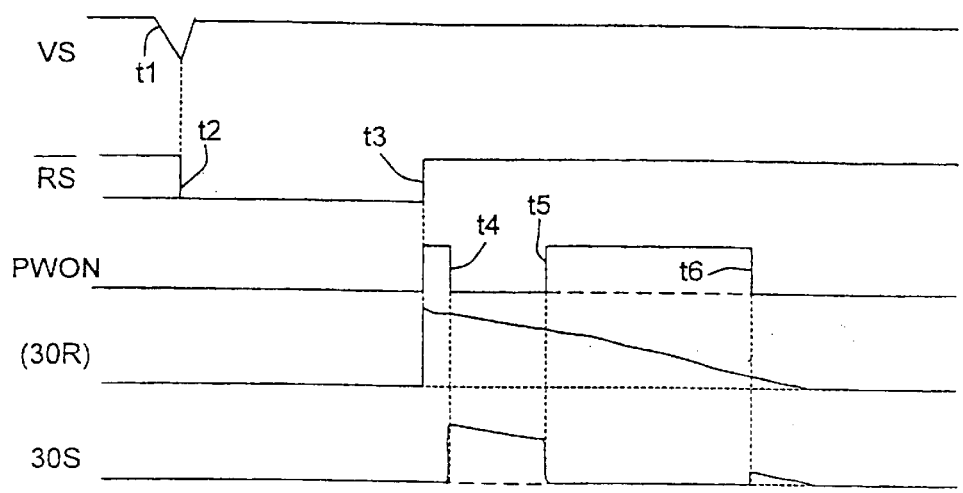
FIG. 2 represents a diagram of the restart circuit of the apparatus.

The timing diagram of FIG. 2 explains this functioning. Instant t1 is considered where there is a very brief electric power cut. As the voltage rapidly drops below the threshold voltage VR, the signal $\overline{RS}$ soon adopts the value "0" at the instant t2 for a certain period of time. Then at instant t3 there is a rising edge RS. In the deriving circuit 30 this gives a voltage whose shape is shown by the curve (30R) of FIG. 2. This voltage rapidly rises and then slowly falls because of the charge loss of the capacitor which forms this deriving circuit. This rising edge detected by the processor causes a value to appear equal to "1" of the signal PWON for a certain period of time ($\approx$32 ms in practice), the value "0" the signal PWON then adopts authorizes the transmission of the signal 30R on the output 30S, which thus creates a beginning of a pulse that starts the process of testing the integrity of the contents of the memory 12. This beginning of the pulse is applied to the input IGN.

At the instant t5 the signal PWON resumes the value "1" and thus cuts the pulse at input ING.

The instant t6 corresponds to the making of a decision that results from the process of verifying the integrity of the memory 12. If the contents of the memory 12 are considered to be correct, the signal PWON retains the value "1", if not it changes to zero.

Figure 3:
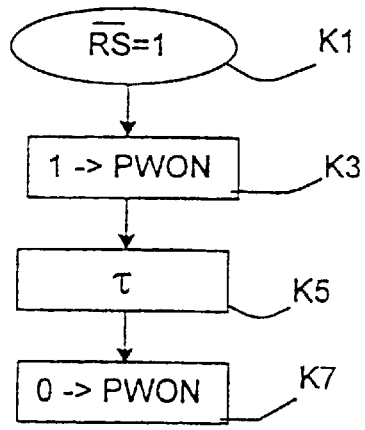
FIG. 3 represents a flow chart explaining the operation of the apparatus in accordance with the invention and FIG. 4 represents another flow chart explaining the operation of the apparatus according to the invention.

In FIG. 3 is shown the flow chart of the operating steps when a rising edge of $\overline{RS}$ appears. These steps comprise the formation of the pulse of PWON between t3 and t4 (FIG. 2). In box K1 is indicated the appearance of this rising edge;

box K3 indicates that the signal PWON is set to "1", the box K5 indicates that the pulse will have a certain width and box K7 finally indicates that the signal PWON is set to "0".

Figure 4:
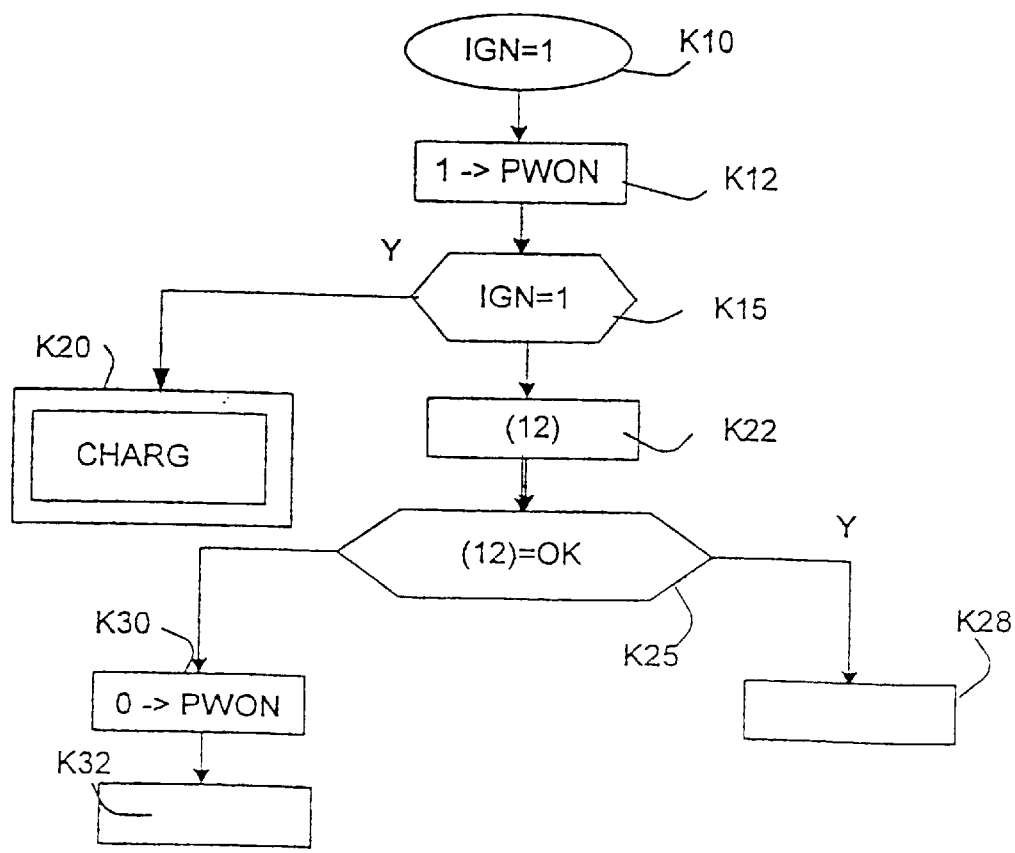

From this moment on, the process is determined by the signal IGN, which is indicated in FIG. 4.

Box K10 indicates the start of the process when the signal IGN adopts the value "1". The box K12 indicates that the signal PWON is forced to adopt the value "1". Then, in box K15, a new test is made of the signal IGN. If this value is equal to "1", it means that the charger is branched, the signal "1" being conveyed by the wire CHARG via the adder circuit 32. The tasks assigned to this type of situation are carried out, for example, lighting of the screen etc. (box K20). If the signal IGN does not have the value "1", the integrity information stored in the memory 12 is examined (box K22) after which they are tested (box K25). If everything is correct, the data of the processor are reconfigured, registers are reloaded with data contained in the memory 12 in which this type of information is saved (box K28). It is to be noted that this memory is less sensitive to very brief electric power cuts by its nature and also by the presence of the capacitor 17.

If the test of box K25 is negative, the signal PWON is set to "0" (box K30) and the processes of restarting and authentication are set off (box K32).

It will be observed that a single input IGN of the microprocessor is used for processing the data of the very brief electric power cut and the management of the apparatus when the charger 16 is branched for recharging the rechargeable battery 15.

It may be observed that the integrity of the memory 12 is not respected when a value set at the start is different when read out. If the logic values contained in the memory 12 have a value "0", which corresponds to the initial state of the memory when it has not been supplied with electric power for a long time, in which case the memory has lost its integrity, its contents have thus been erased.

What is claimed is:

1. An apparatus comprising;
    an electric power supply device for supplying a voltage to the apparatus,
    an electric power cut detecting circuit for detecting cuts of this supply voltage,
    a memory fed by this electric power supply device,
    a device for loading this memory,
    a restarting device for initializing the apparatus, characterized in that it further includes
    a control device for controlling the integrity of the memory to switch the restart device into service in the case where the integrity of said memory is lost.

2. An apparatus as claimed in claim 1, characterized in that the restart device is inhibited if the apparatus was dead before said very brief electric power cut.

3. An apparatus as claimed in claim 1, characterized in that the control device further comprises a check for information that occurs inserted in said memory whose value is different from the contained information when this memory is no longer supplied with electric power.

4. An apparatus as claimed in claim 1 for which the electric power supply device is formed by a rechargeable battery and which has a restart input, characterized in that this input is also connected to a wire indicating the presence of a charger.

5. A method of starting and restarting an apparatus as claimed in claim 1, comprising a processor and a random-access memory, characterized in that when a very brief electric power cut has been detected, the integrity of said random-access memory is tested to verify if the contents of the random-access memory have not been changed during the very brief electric power cut.

6. A method of starting and restarting an apparatus as claimed in claim 5 wherein the restarting of the apparatus is inhibited if the contents of the memory have changed.

7. An apparatus having a power supply with a power cut detecting circuit for detecting lose of power from the power supply, a memory that receives power from the power supply device, a mechanism for reading and writing to the memory, and a restarting device for initializing the apparatus comprising:
    a control device that restarts the apparatus if integrity for the memory is lost.

8. The apparatus of claim 7 wherein the control device tests the memory to insure integrity of the memory.

9. The apparatus or claim 7 wherein the control device further comprises a check for information that occurs inserted in said memory whose value is different from the contained in information when this memory is no longer supplied with electric power.

10. An apparatus as claimed in claim 7 wherein the power supply device is a rechargeable battery and which has a restart input and an operative connection indicating the presence of a charger.

* * * * *